(12) United States Patent
Takizawa et al.

(10) Patent No.: US 11,492,950 B2
(45) Date of Patent: Nov. 8, 2022

(54) ABNORMALITY DETERMINATION APPARATUS FOR AMMONIA SENSOR

(71) Applicant: DENSO CORPORATION, Kariya (JP)

(72) Inventors: Kensuke Takizawa, Nisshin (JP); Toshihiko Harada, Nisshin (JP); Hiroki Ichikawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/223,579

(22) Filed: Apr. 6, 2021

(65) Prior Publication Data

US 2021/0222607 A1 Jul. 22, 2021

Related U.S. Application Data

(63) Continuation of application No. PCT/JP2019/035763, filed on Sep. 11, 2019.

(30) Foreign Application Priority Data

Oct. 9, 2018 (JP) .............................. JP2018-191238

(51) Int. Cl.
*F01N 11/00* (2006.01)
*B01D 53/94* (2006.01)
*F01N 3/20* (2006.01)

(52) U.S. Cl.
CPC .......... *F01N 11/00* (2013.01); *B01D 53/9418* (2013.01); *B01D 53/9495* (2013.01);
(Continued)

(58) Field of Classification Search
CPC ...... F01N 11/00; F01N 3/208; F01N 2550/03; F01N 2900/0416; F01N 2900/1402;
(Continued)

(56) References Cited

U.S. PATENT DOCUMENTS

2010/0050600 A1  3/2010 Suzuki
2016/0356196 A1* 12/2016 Nakano ..................... F01N 9/00
2017/0045471 A1*  2/2017 Maeda ................. G01N 27/407

FOREIGN PATENT DOCUMENTS

JP  2003-328860  11/2003
JP  2008-202425   9/2008
(Continued)

*Primary Examiner* — Brandon D Lee
(74) *Attorney, Agent, or Firm* — Nixon & Vanderhye P.C.

(57) ABSTRACT

An abnormality determination apparatus for an ammonia sensor is usable in an exhaust purification system including a catalyst, a supply apparatus, an ammonia sensor, an $NO_X$ sensor, and an oxygen sensor. During a continuation period within which ammonia supply to the catalyst continues after the supply apparatus stops supply of reductant, the abnormality determination apparatus calculates the ammonia concentration on a downstream side of the catalyst as a first concentration value, based on an output of the ammonia sensor and an output of the oxygen sensor. During the continuation period, the abnormality determination apparatus calculates the ammonia concentration on the downstream side of the catalyst as a second concentration value, based on an output of the $NO_X$ sensor and the output of the oxygen sensor. The abnormality determination apparatus determines presence or absence of abnormality in the ammonia sensor based on the first concentration value and the second concentration value.

6 Claims, 3 Drawing Sheets

(52) U.S. Cl.
CPC ........... *F01N 3/208* (2013.01); *F01N 3/2066* (2013.01); *F01N 11/007* (2013.01); *F01N 2550/03* (2013.01); *F01N 2560/021* (2013.01); *F01N 2560/025* (2013.01); *F01N 2560/026* (2013.01); *F01N 2610/02* (2013.01); *F01N 2900/0416* (2013.01); *F01N 2900/1402* (2013.01); *F01N 2900/16* (2013.01)

(58) Field of Classification Search
CPC ........... F01N 2900/16; F01N 2560/025; F01N 2560/026; F01N 2900/1818; F01N 3/2066; F01N 11/007; F01N 2560/021; F01N 2610/02; F01N 2610/1453; B01D 53/9418; B01D 53/9495; B01D 53/9409; B01D 2251/2067; B01D 2258/012; Y02T 10/12; Y02T 10/40
See application file for complete search history.

(56) References Cited

FOREIGN PATENT DOCUMENTS

| | | |
|---|---|---|
| JP | 2011-117462 | 6/2011 |
| JP | 2016-223446 | 12/2016 |
| JP | 2017-141713 | 8/2017 |
| JP | 6238564 | 11/2017 |

\* cited by examiner

US 11,492,950 B2

ABNORMALITY DETERMINATION APPARATUS FOR AMMONIA SENSOR

CROSS-REFERENCE TO RELATED APPLICATIONS

The present application is a continuation application of International Application No. PCT/JP2019/035763, filed Sep. 11, 2019, which claims priority to Japanese Patent Application No. 2018-191238, filed Oct. 9, 2018. The contents of these applications are incorporated herein by reference in their entirety.

BACKGROUND

Technical Field

The present disclosure relates to an abnormality determination apparatus for an ammonia sensor.

Background Art

Conventionally, a system in which, to purify exhaust gas that is discharged from an internal combustion engine, a selective catalytic reduction (SCR) catalyst (selective reduction catalyst) is set inside an exhaust pipe and $NO_X$ is purified by urea water that serves as a reductant is known. In such a system, ammonia that is generated from the urea water may not be used for purification and may leak out towards a downstream side of the SCR catalyst. An ammonia sensor is provided on the downstream side of the SCR catalyst inside the exhaust pipe to detect outflow of ammonia towards the downstream side of the SCR catalyst.

SUMMARY

One aspect of the present disclosure provides an abnormality determination apparatus for an ammonia sensor in an exhaust purification system that includes a selective reduction-type catalyst, a supply apparatus, an ammonia sensor, an $NO_X$ sensor, and an oxygen sensor. During a continuation period within which ammonia supply to the catalyst continues after the supply apparatus stops the supply of reductant, the abnormality determination apparatus calculates the ammonia concentration on the downstream side of the catalyst as a first concentration value, based on an output of the ammonia sensor and an output of the oxygen sensor. During the continuation period, the abnormality determination apparatus calculates the ammonia concentration on the downstream side of the catalyst as a second concentration value, based on an output of the $NO_X$ sensor and the output of the oxygen sensor. The abnormality determination apparatus determines presence or absence of an abnormality in the ammonia sensor based on the first concentration value and the second concentration value.

DESCRIPTION OF THE EMBODIMENTS

Figure 1:
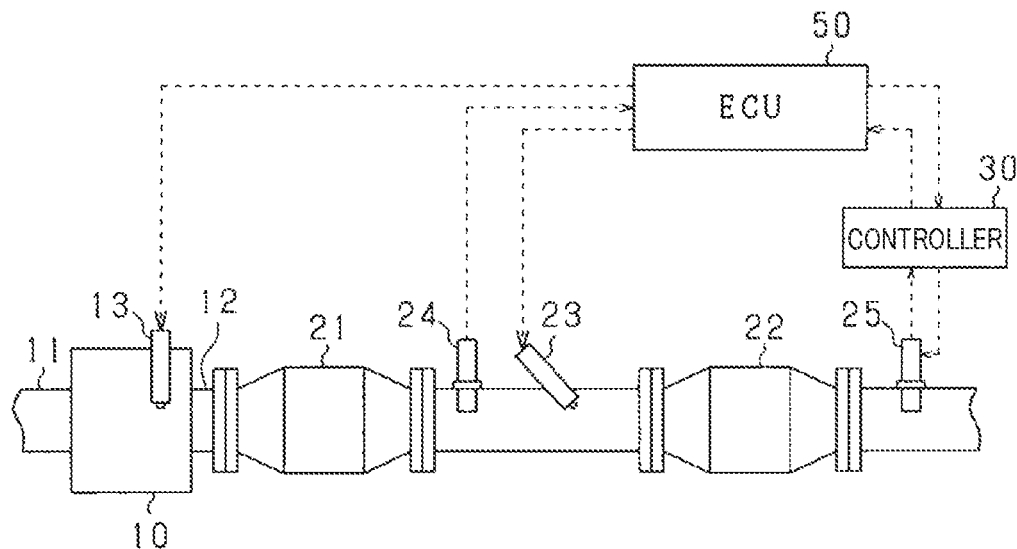
FIG. 1 is an overall configuration diagram of an exhaust purification system of an internal combustion engine.

Japanese Patent Publication No. 6238564 discloses an apparatus that diagnoses an abnormality in an ammonia sensor. Specifically, by taking advantage of an $NO_X$ sensor being capable of detecting ammonia, the apparatus determines whether the ammonia sensor is normal based on an absolute value of a difference between an output value of an ammonia component detected by the $NO_X$ sensor and an output value of the ammonia sensor.

In a configuration described in Japanese Patent Publication No. 6238564, an abnormality in the ammonia sensor is determined by only the absolute value of the difference between the output value of the $NO_X$ sensor and the output value of the ammonia sensor. Therefore, effects of other elements on these sensors are not taken into consideration. An issue arises in that accuracy is low.

It is thus desired to to provide an abnormality detection apparatus for an ammonia sensor that has higher accuracy.

An exemplary embodiment provides an abnormality determination apparatus for an ammonia sensor in an exhaust purification system. The exhaust purification system includes: a selective reduction-type catalyst that is provided in an exhaust passage of an internal combustion engine and purifies nitrogen oxide in exhaust gas using ammonia; a supply apparatus that supplies a reductant for generating ammonia on an upstream side of the catalyst in the exhaust passage; an ammonia sensor that is provided on a downstream side of the catalyst and outputs a sensor signal based on an ammonia concentration in the exhaust gas; an $NO_X$ sensor that is provided on the downstream side of the catalyst and outputs a sensor signal based on an $NO_X$ concentration in the exhaust gas; and an oxygen sensor that is provided on the downstream side of the catalyst and outputs a sensor signal based on an oxygen concentration in the exhaust gas.

The abnormality determination apparatus includes: a first calculating unit that, during a continuation period within which ammonia supply to the catalyst continues after the supply apparatus stops the supply of reductant, calculates the ammonia concentration on the downstream side of the catalyst as a first concentration value, based on the output of the ammonia sensor and the output of the oxygen sensor; a second calculating unit that, during the continuation period, calculates the ammonia concentration on the downstream side of the catalyst as a second concentration value, based on the output of the $NO_X$ sensor and the output of the oxygen sensor; and an abnormality determining unit that determines presence or absence of an abnormality in the ammonia sensor based on the first concentration value and the second concentration value.

In the exhaust purification system that purifies $NO_X$ in the exhaust gas using a selective reduction-type catalyst, the $NO_X$ sensor and the ammonia senor are provided on the downstream side of the catalyst. Monitoring of $NO_X$ and ammonia that flow towards the downstream side of the catalyst is performed by these sensors. Here, the $NO_X$ sensor has sensitivity not only to $NO_X$ but also to ammonia, and outputs a detection signal based on the ammonia concentration contained in the exhaust gas.

In this case, in a state in which ammonia is contained in the exhaust gas, abnormality determination regarding the ammonia sensor can be performed by a comparison of the output of the NO$_X$ sensor and the output of the ammonia sensor. Even in a state in which the supply of the reductant for generating ammonia is stopped, an ammonia component is attached (adsorbed) to a wall surface of the exhaust passage and the catalyst. Ammonia flows towards the downstream side of the catalyst. Therefore, even when the supply apparatus that supplies the reductant is stopped, the supply of ammonia inside the exhaust passage continues, and the abnormality determination can be performed during this continuation period.

In addition, ammonia sensitivity of the NO$_X$ sensor and ammonia sensitivity of the ammonia sensor both have oxygen-concentration dependence. Therefore, the ammonia concentration on the downstream side of the catalyst is calculated as the first concentration value based on the output of the ammonia sensor and the output of the oxygen sensor. The ammonia concentration on the downstream side of the catalyst is calculated as the second concentration value based on the output of the NO$_X$ sensor and the output of the oxygen sensor. As a result, correction for oxygen concentration dependence can be appropriately performed regarding the ammonia concentration detected by each sensor. Therefore, accuracy of abnormality detection can be increased.

According to a present embodiment, an exhaust purification system for an engine is constructed for an in-vehicle, multi-cylinder diesel engine that is an internal combustion engine. An overall configuration diagram of the engine exhaust purification system is shown in FIG. 1. Here, the internal combustion engine is not limited to the diesel engine and may be a lean-burn gasoline engine.

An air intake passage 11 that supplies air to each combustion chamber and an exhaust passage 12 that discharges exhaust gas from inside each combustion chamber are connected to an engine 10. In addition, a fuel injection apparatus 13 that injects fuel into each combustion chamber is provided in the engine 10.

An upstream-side catalyst 21 and a downstream-side catalyst 22 are provided in the exhaust passage 12. The upstream-side catalyst 21 includes an oxidation catalyst that oxidizes HC, CO, and the like that are contained in the exhaust gas that is discharged from the engine 10, and a diesel particulate filter (DPF) that collects particulate matter (PM).

The downstream-side catalyst 22 is a selective reduction catalyst (SCR) that reduces nitrogen oxide (NO$_X$) in the exhaust gas using ammonia. In the downstream-side catalyst 22, urea water that is supplied by a urea water supply apparatus 23 turns into ammonia (NH$_3$), and NO$_X$ is selectively reduced and purified. Here, the downstream-side catalyst 22 corresponds to a catalyst. The urea water corresponds to a reductant. The urea water supply apparatus 23 corresponds to a supply apparatus. In addition, an aqueous ammonia solution or the like may be used as the reductant.

In addition, in the exhaust passage 12, a first combined sensor 24 that outputs signals respectively based on concentrations of NO$_X$ and oxygen in the exhaust gas is provided between the upstream-side catalyst 21 and the downstream-side catalyst 22. In the exhaust passage 12, a second combined sensor 25 that outputs signals respectively based on concentrations of NO$_X$, oxygen, and ammonia in the exhaust is provided downstream of the downstream-side catalyst 22. Detection results of the combined sensors 24 and 25 are outputted to the ECU 50. Here, the second combined sensor 25 corresponds to an ammonia sensor, an NO$_X$ sensor, and an oxygen sensor.

The combined sensors 24 and 25 are exposed to a detected gas atmosphere. In each of the combined sensors 24 and 25, a solid electrolyte that has oxygen conductivity is provided. A reference electrode that is exposed to reference gas that serves as reference and a detection electrode that is exposed to detected gas are provided in the solid electrolyte. In addition, each of the combined sensors 24 and 25 has an insulating substrate on which a circuit that connects the reference electrode and the detection electrode, or the like is provided.

Furthermore, each of the combined sensors 24 and 25 has a structure in which a plurality of detected gases are detected by a single combined sensor, such as by a portion of a structure of a sensor for detecting a plurality of types of detected gases being shared. For example, a plurality of detection electrodes and reference electrodes that detect the detected gases may be provided in a single solid electrolyte. Alternatively, solid electrolytes that are provided with the electrodes that detect the detected gases may be laminated. Alternatively, a substrate on which a circuit that connects the electrodes that detect the detected gases is formed may be shared. In the combined sensors 24 and 25, as a result of the sensors that detect the plurality of detected gases being integrated, during an abnormality determination described hereafter, an error in a detection result that is caused by a difference in a position in which the detected gas is detected inside the exhaust passage 12 is unlikely to occur.

In the second combined sensor 25, the NO$_X$ sensor, the oxygen sensor, and the ammonia sensor are integrally incorporated. A controller 340 that controls these sensors is provided. The controller 30 is a microcomputer that is composed of a central processing unit (CPU), a read-only memory (ROM), a random access memory (RAM), and the like. The controller 30 is connected to the ECU 50. The controller 30 outputs detection values of the sensors to the ECU 50, and acquires an operating state of the engine 10 and the like from the ECU 50. Here, the controller 30 corresponds to an abnormality detection apparatus.

The ECU 50 includes a microcomputer that is composed of a CPU, a ROM, a RAM, and the like. The ECU 50 performs control of an air amount and the fuel injection apparatus 13, based on a rotation frequency and a load of the engine 10. In addition, the ECU 50 performs control of the urea water supply apparatus 23 and the like, based on operating conditions of the engine 10 and outputs of various sensors.

Next, abnormality determination regarding the ammonia sensor will be described. The NO$_X$ sensor has sensitivity towards ammonia in addition to NO$_X$ and outputs a detection signal based on the ammonia concentration contained in the exhaust gas. As a result, in a state in which ammonia is contained in the exhaust gas, abnormality determination regarding the ammonia sensor can be performed through a comparison of the output of the NO$_X$ sensor and the output of the ammonia sensor.

Here, a condition for performing the abnormality determination regarding the ammonia sensor will be described. During fuel cut in which fuel injection is stopped and combustion in the engine 10 is stopped, exhaust gas resulting from combustion is substantially not present inside the exhaust passage 12.

In a state in which the exhaust gas resulting from combustion in the engine 10 is not present, NO$_X$ is substantially not present inside the exhaust passage 12. Therefore, the ammonia sensor and the NO$_X$ sensor are not affected by NO$_X$. In this state, error derived from NOX does not occur.

Therefore, this state enables a more accurate abnormality determination to be performed and is preferable.

Figure 2:
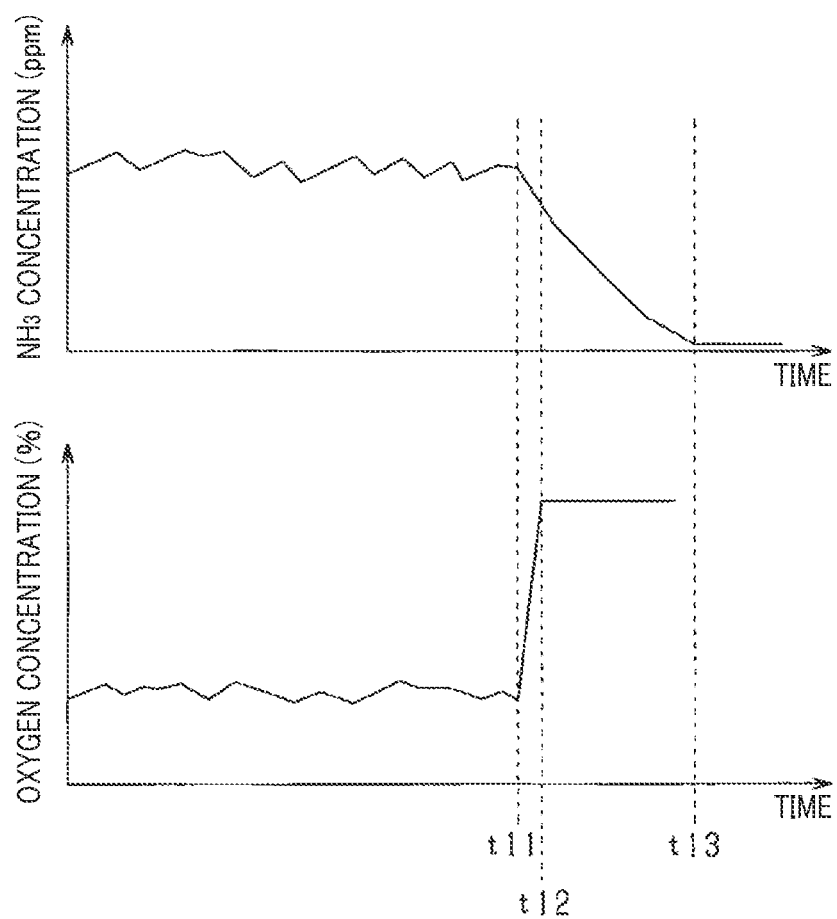
FIG. 2 is a time chart of oxygen concentration and $NH_3$ concentration during fuel-cut.

Oxygen concentration and ammonia concentration during fuel cut will be described in detail. FIG. 2 is a time chart of the oxygen concentration and the ammonia concentration during fuel cut.

Before timing t11, combustion is performed in the engine 10. The urea water supply apparatus 23 sprays urea water into the exhaust passage 12 and on the downstream-side catalyst 22 to reduce $NO_X$ that is contained in the exhaust gas resulting from combustion. In addition, ammonia is generated from the urea water inside the exhaust passage 12 and on the downstream-side catalyst 22.

Here, the urea water that is sprayed into the exhaust passage 12 and on the downstream-side catalyst 22 does not all immediately turn into ammonia. A portion thereof attaches to a wall surface of the exhaust passage 12 and the downstream-side catalyst 22 in the urea-water state. In addition, ammonia is produced as a result of exposure to a high temperature. That is, a slight time difference occurs between a timing of injection and the timing at which the ammonia is generated. In addition, because ammonia is a strongly adsorbed gas, a portion of the generated ammonia remains attached inside the exhaust passage 12 and on the downstream-side catalyst 22.

At timing t11, when fuel injection is stopped and combustion in the engine 10 is stopped, the urea water supply apparatus 23 stops the supply of urea water. In the state in which fuel injection is stopped and combustion is not performed, new $NO_X$ is not generated. Therefore, the supply of urea water for reducing $NO_X$ is preferably stopped. However, even when the supply of urea water is stopped, the urea water that is attached inside the exhaust passage 12 and on the downstream-side catalyst 22 changes to ammonia and is discharged to the downstream side of the downstream-side catalyst 22.

In addition, an ammonia component that is attached inside the exhaust passage 12 and the downstream-side catalyst 22 is gradually discharged. As a result, ammonia continues to flow towards the downstream side of the downstream-side catalyst 22 while the concentration thereof gradually decreases until timing t13. Here, a period from timing t11 to t13 corresponds to a continuation period.

In addition, in the state in which fuel injection is stopped and combustion in the engine 10 is not performed, the oxygen concentration inside the exhaust passage 12 gradually approaches the oxygen concentration of atmospheric air. At timing t12, the oxygen concentration reaches equilibrium with the oxygen concentration of atmospheric air.

As a result, a period from timing t12 to timing t13 is a period that is ideal for performing an abnormality determination process in which, in a state of equilibrium in which the oxygen concentration in the exhaust gas is greater than a predetermined value, $NO_X$ is not present in the exhaust gas and ammonia is present in the exhaust gas while changing in concentration.

Figure 3:
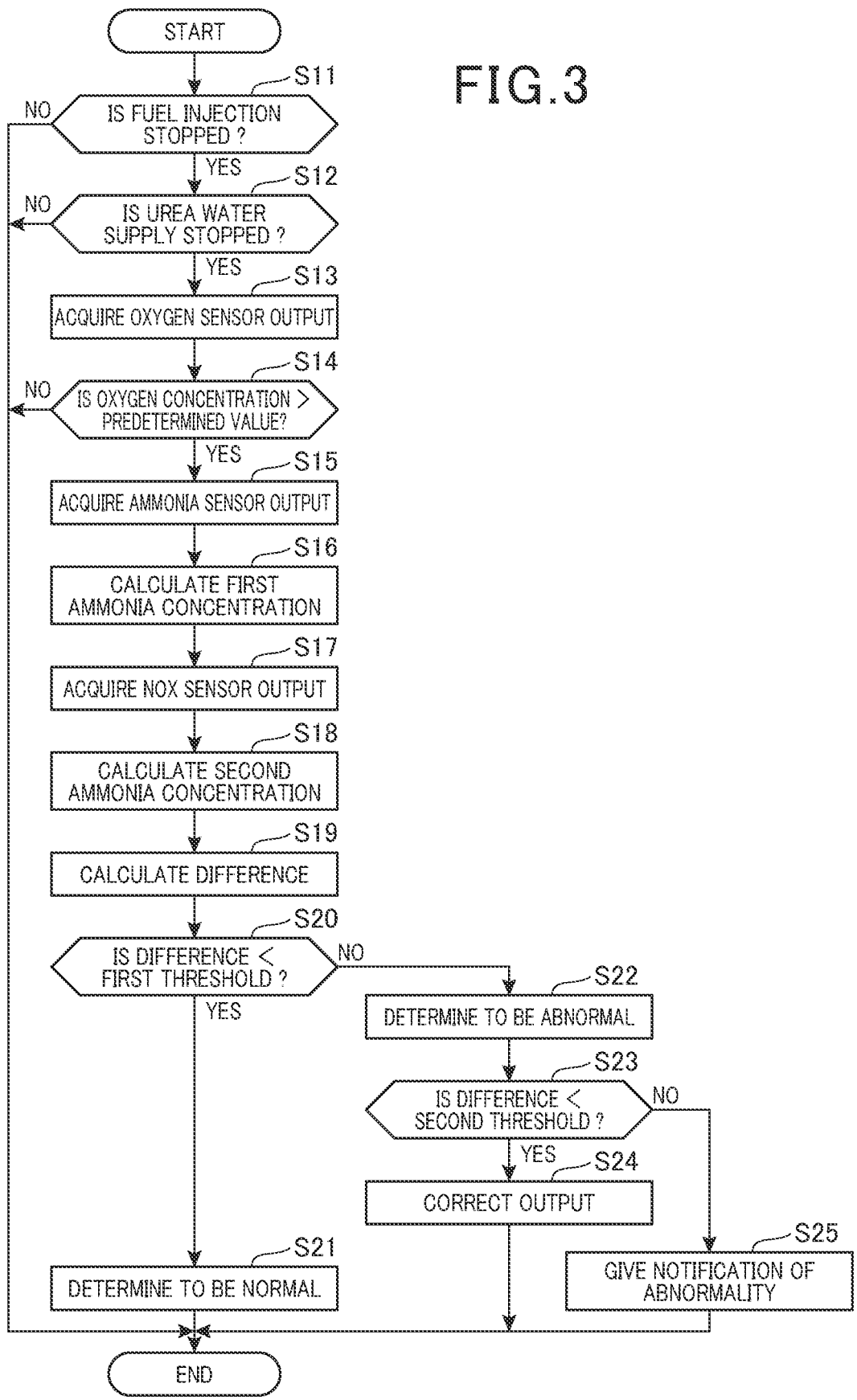
FIG. 3 is a flowchart of an abnormality detection process for an ammonia sensor.

Next, the abnormality determination process for the ammonia sensor will be described. FIG. 3 is a flowchart that is performed by the controller 30 and is repeatedly performed at a predetermined cycle by the controller 30.

At S11, the controller 30 determines whether fuel injection is stopped in the engine 10, that is, whether the engine 10 is in a fuel-cut state. When determined that fuel injection is not stopped based on information acquired from the ECU 50, the controller 30 determines that the environment is not suitable for abnormality determination and ends the process. When determined that fuel injection is stopped, the controller 30 proceeds to S12.

At S12, the controller 30 determines whether the urea water supply apparatus 23 is stopped. When determined that the urea water supply apparatus 23 is not stopped based on information acquired from the ECU 50, the controller 30 determines that the environment is not suitable for abnormality determination and ends the process. When determined that the urea water supply apparatus 23 is stopped, the controller 30 proceeds to S13.

At S13, the controller 30 acquires the output (sensor signal) of the oxygen sensor of the second combined sensor 25. Then, the controller 30 calculates the oxygen concentration based on the output of the oxygen sensor. The output of the oxygen sensor and the oxygen concentration have a positive correlation. The output of the oxygen sensor is converted to the oxygen concentration by a map or a relational expression that is calculated in advance through an experiment or the like.

At S14, the controller 30 determines whether the oxygen concentration calculated at S13 is greater than a predetermined value. When determined that the oxygen concentration is equal to or less than the predetermined value, the controller 30 determines that the exhaust gas during combustion still remains inside the exhaust passage 12, determines that the environment is not suitable for abnormality determination, and ends the process. When determined that the oxygen concentration is greater than the predetermined value, the controller 30 proceeds to S15.

Here, the predetermined value is preferably a value that enables determination as to whether the oxygen concentration has reached a state of equilibrium that is substantially identical to the oxygen concentration of atmospheric air. In addition, rather than the determination being made based on the oxygen concentration, the determination may be made based on the output of the oxygen sensor.

Figure 4:
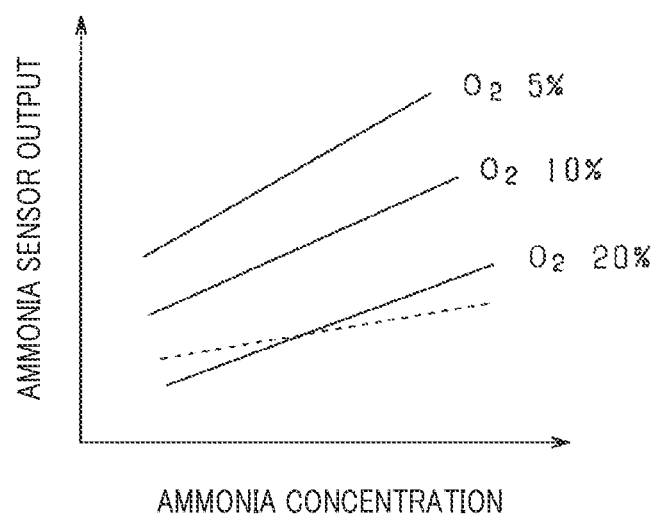
FIG. 4 is a diagram of a relationship between an output value of the ammonia sensor and the ammonia concentration.

At S15, the controller 30 acquires the output (sensor signal) of the ammonia sensor of the second combined sensor 25. Then, at S16, the controller 30 calculates a first ammonia concentration that is a first concentration value, based on the output of the oxygen sensor and the output of the ammonia sensor. The first ammonia concentration is calculated based on the output of the oxygen sensor and the output of the ammonia sensor using a correlation map of the oxygen concentration-ammonia concentration-sensor output of the ammonia sensor, shown in FIG. 4. The correlation map is generated in advance by both of the oxygen concentration and the ammonia concentration of a normal ammonia sensor being changed and measured, and is stored in the controller 30.

The output of the ammonia sensor and the ammonia concentration have a positive correlation in which the output increases as the ammonia concentration in the exhaust gas increases. In addition, even when the ammonia concentration in the exhaust gas is the same, as a result of a reaction between ammonia and oxygen, the output of the ammonia sensor decreases as the oxygen concentration increases. That is, ammonia sensitivity of the ammonia sensor decreases as the oxygen concentration increases. Using such a correlation, the first ammonia concentration is calculated based on the output of the oxygen sensor and the output of the ammonia sensor. Here, S16 corresponds to a first calculating unit.

At S17, the controller 30 acquires the output (sensor signal) of the $NO_X$ sensor of the second combined sensor 25. Then, at S18, the controller 30 calculates a second ammonia concentration that is a second concentration value based on the output of the oxygen sensor and the output of the $NO_X$ sensor by a known method such as that disclosed in JP-A-2015-215334.

Specifically, the second ammonia concentration is calculated based on the output of the oxygen sensor and the output of the ammonia sensor using a correlation map of oxygen concentration-ammonia concentration-sensor output of the $NO_X$ sensor. The correlation map is generated in advance by both the oxygen concentration and the ammonia concentration of a normal $NO_X$ sensor being changed and measured, and is stored in the controller 30.

The output of the $NO_X$ sensor and the ammonia concentration have a positive correlation in which the output increases as the ammonia concentration in the exhaust gas increases. In addition, even when the ammonia concentration in the exhaust gas is the same, the output of the ammonia sensor decreases as the oxygen concentration increases. That is, ammonia sensitivity of the $NO_X$ sensor decreases as the oxygen concentration increases. Using such a correlation, the second ammonia concentration is calculated based on the output of the oxygen sensor and the output of the $NO_X$ sensor.

Here, a degree of dependence on oxygen differs between the ammonia sensor and the $NO_X$ sensor, that is, even when the oxygen concentration is the same, a manner in which ammonia sensitivity decreases differs between the ammonia sensor and the $NO_X$ sensor. Therefore, differing correlation maps are used for the ammonia sensor and the $NO_X$ sensor. In addition, S18 corresponds to a second calculating unit.

Then, at S19, the controller 30 compares the first ammonia concentration calculated at S16 and the second ammonia concentration calculated at S18. Specifically, an absolute value of a value obtained by the second ammonia concentration being subtracted from the first ammonia concentration is calculated as a difference that is a difference between the first ammonia concentration and the second ammonia concentration.

At S20, the controller 30 determines whether a comparison result of the comparison between the first ammonia concentration and the second ammonia concentration at S19 is less than a first threshold. Specifically, the controller 30 determines whether the calculated difference between the first ammonia concentration and the second ammonia concentration is less than the first threshold. When determined that the difference is less than the first threshold, at S21, the controller 30 determines that the ammonia sensor is normal and ends the process. At S20, when determined that the difference is greater than the first threshold, at S22, the controller 30 determines that the ammonia sensor is abnormal.

Here, the difference between the first ammonia concentration and the second ammonia concentration is calculated at S19 and the abnormality determination is performed based on the difference at S20. However, the abnormality determination may be performed using a ratio of the first ammonia concentration divided by the second ammonia concentration, or another parameter that expresses a deviation between the first ammonia concentration and the second ammonia concentration. In addition, S20 corresponds to an abnormality determining unit.

Then, at S23, the controller 30 determines whether the difference between the first ammonia concentration and the second ammonia concentration calculated at S19 is less than a second threshold. The second threshold is a value that is greater than the first threshold, and is used to determine whether the deviation is to a degree that correction makes the error too large. When determined that the difference is less than the second threshold at S23, at S24, the controller 30 performs output correction of the ammonia sensor using a correction map that is calculated in advance, based on the value of the difference.

For example, the correction map indicates a correlation in which the correction value increases as the difference increases, and is calculated in advance by an experiment or the like. Meanwhile, at S23, when determined that the difference is greater than the second threshold at, the controller 30 considers the deviation to be uncorrectable, and at S25, provides a notification of an occurrence of an abnormality in the ammonia sensor.

As a method for the notification of an occurrence of an abnormality, there are methods such as a failure warning light being lit. Here, correction is not performed when the ammonia sensor is determined to be normal at S21. However, correction may also be formed when the difference is less than the first threshold. In addition, even when the difference is greater than the second threshold, correction may be performed even though the error will increase. Furthermore, S23 to S25 correspond to a correcting unit.

Here, the process in FIG. 3 is preferably performed a plurality of times during the continuation period within which the ammonia supply inside the exhaust passage 12 is continued after the urea water supply apparatus 23 has stopped the supply of urea water. When fuel injection is stopped, that is, when combustion in the engine 10 is stopped, the state of equilibrium is reached in a state in which the oxygen output is greater than the predetermined value. Changes in the oxygen concentration hardly occur.

That is, because the oxygen concentration is in the state of equilibrium, a relationship between the ammonia concentration in the exhaust gas and the output of the ammonia sensor is uniquely determined. Meanwhile, in a state in which the supply of ammonia to the downstream-side catalyst 22 is stopped, a desorption amount gradually decreases. Therefore, the ammonia concentration in the exhaust gas gradually decreases.

The abnormality determination is preferably performed a plurality of times based on changes over time in the ammonia concentration in a state such as the foregoing. In addition, concentration can be converted to output by a relational expression in which each sensor output at the oxygen concentration that is in the state of equilibrium, calculated in advance, is converted to ammonia concentration.

Calculation of the ammonia concentration can be performed a plurality of times by the same relational expression. In general, in the ammonia sensor that has degraded and is in an abnormal state, as indicated by a broken line in FIG. 4, a change amount of the sensor output in relation to a change in the ammonia concentration decreases. Therefore, if only a single ammonia concentration is used, the ammonia concentration may coincidentally belong to a concentration area that has a small difference.

Here, as a result of the abnormality determination being performed a plurality of times, and more preferably, a proportion of the change amount in the correlation (a slope of the expression in the correlation map) being calculated and compared to that of a normal ammonia sensor, a highly accurate abnormality determination can be performed.

According to the present embodiment described above, following effects are achieved.

In the exhaust purification system that purifies $NO_X$ in the exhaust gas using the downstream-side catalyst 22 that is a selective reduction-type catalyst, the $NO_X$ sensor and the ammonia sensor are provided on the downstream side of the downstream-side catalyst 22. Monitoring of $NO_X$ and ammonia that flow towards the downstream side of the catalyst is performed by these sensors. Here, the $NO_X$ sensor has sensitivity not only to $NO_X$ but also to ammonia, and outputs a detection signal based on the ammonia concentration contained in the exhaust gas.

In this case, in a state in which ammonia is contained in the exhaust gas, abnormality determination regarding the ammonia sensor can be performed by a comparison of the output of the $NO_X$ sensor and the output of the ammonia sensor. Even in a state in which the supply of the reductant for generating ammonia is stopped, the ammonia component is attached to the wall surface of the exhaust passage 12 and the downstream-side catalyst 22. Ammonia flows towards the downstream side of the downstream-side catalyst 22. Therefore, even when the urea water supply apparatus 23 that supplies urea water that is the reductant is stopped, the supply of ammonia inside the exhaust passage 12 continues, and the abnormality determination can be performed during this continuation period.

In addition, ammonia sensitivity of the $NO_X$ sensor and ammonia sensitivity of the ammonia sensor both have oxygen-concentration dependence. Therefore, the ammonia concentration on the downstream side of the downstream-side catalyst 22 is calculated as the first ammonia concentration based on the output of the ammonia sensor and the output of the oxygen sensor. The ammonia concentration on the downstream side of the downstream-side catalyst 22 is calculated as the second ammonia concentration based on the output of the $NO_X$ sensor and the output of the oxygen sensor. As a result, correction for oxygen concentration dependence can be appropriately performed regarding the ammonia concentration detected by each sensor. Therefore, accuracy of abnormality detection can be increased.

After combustion in the engine 10 is stopped, the oxygen concentration inside the exhaust passage 12 gradually approaches the oxygen concentration of atmospheric air. In the state in which the oxygen concentration inside the exhaust passage 12 is greater than the predetermined value, it can be determined that combustion in the engine 10 is stopped and the exhaust gas resulting from combustion is substantially not present inside the exhaust passage 12.

In the state in which the exhaust gas resulting from combustion in the engine 10 is not present, the ammonia sensor and the $NO_X$ sensor are not affected by $NO_X$. As a result of the abnormality determination regarding the ammonia sensor being performed in this state, because error derived from $NO_X$ does not occur, a more accurate abnormality determination can be performed.

In addition, in the state in which the supply of ammonia to the downstream-side catalyst 22 is stopped, the amount of ammonia gradually decreases on the downstream side of the catalyst. Therefore, the ammonia concentration in the exhaust gas gradually decreases. As a result of the abnormality determination being performed a plurality of times based on changes over time in the ammonia concentration, while the state in which the exhaust gas resulting from combustion in the engine 10 is not present is maintained, a highly accurate abnormality determination can be performed.

The output value of the ammonia sensor is corrected based on the result of the comparison between the first ammonia concentration and the second ammonia concentration. As a result of correction being performed even when the ammonia sensor is degraded, stability of the calculated ammonia concentration can be ensured.

When the difference between the first ammonia concentration and the second ammonia concentration is large, the abnormality in the ammonia sensor is thought to be serious. In this case, rather than correction being performed and the ammonia sensor being continued to be used, notification of an occurrence of an abnormality in the ammonia sensor is given. As a result, response based on a degree of abnormality can be performed.

Other Embodiments

The present disclosure is not limited to the above-described embodiments and may, for example, be carried out in the following manner.

The abnormality determination process for the ammonia sensor may be performed even other than when fuel injection is stopped. When the abnormality determination process is performed other than when fuel injection is stopped, the processes at S11, S13, and S16 are omitted. However, when the abnormality determination process for the ammonia sensor is performed other than when fuel injection is stopped, because $NO_X$ is also present in the exhaust gas, the output of the $NO_X$ sensor includes both output derived from $NO_X$ and output derived from ammonia.

Therefore, for example, the output derived from $NO_X$ is calculated by the $NO_X$ concentration in the exhaust gas being estimated from an engine parameter outputted by the ECU 50, such as an engine load or a fuel injection amount, or the $NO_X$ concentration after passage through the downstream-side catalyst 22 being estimated from the output of the $NO_X$ sensor detected by the first combined sensor 24. Then, as a result of the output derived from $NO_X$ being subtracted from the output of the $NO_X$ sensor, the output derived from ammonia of the $NO_X$ sensor can be calculated.

At S16 to S20 in FIG. 3, the abnormality determination is performed using the ammonia concentration as the first concentration value and the second concentration value. However, the abnormality determination may be performed using the outputs (sensor signals) of the sensors as the first concentration value and the second concentration value. In this case, at S16 that is the first calculating unit, a first ammonia output that takes into consideration the effects of oxygen concentration is calculated by a correlation map that is prepared in advance, without being converted to ammonia concentration.

In addition, at S18 that corresponds to the second calculating unit, the second ammonia concentration calculated by the $NO_X$ sensor is converted to an ammonia output value that corresponds to the ammonia concentration of a normal ammonia sensor, and calculated as the second ammonia output. Then, at S19, the first ammonia output and the second ammonia output are compared.

According to the above-described embodiment, the controller 30 performs control of sensor elements 31 for degradation diagnosis and the like. However, when the ammonia sensor does not have the controller 30 and is only a sensor element, control of a sensor element for abnormality determination and the like may be performed by the ECU 50 or the like.

According to the above-described embodiment, the combined sensors 24 and 25 are provided. However, the $NO_X$ sensor, the oxygen sensor, and the ammonia sensor may each be provided in the exhaust passage 12.

The control unit (abnormality determination apparatus) and the method thereof described in the present disclosure may be actualized by a dedicated computer that is provided so as to be configured by a processor and a memory, the processor being programmed to provide one or a plurality of functions that are realized by a computer program.

Alternatively, the control unit and the method thereof described in the present disclosure may be actualized by a dedicated computer that is provided by a processor being configured by a single dedicated hardware logic circuit or more. Still alternatively, the control unit and the method thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory computer-readable storage medium that can be read by a computer as instructions to be performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. An abnormality determination apparatus for an ammonia sensor in an exhaust purification system,
the exhaust purification system comprising:
   a selective reduction-type catalyst that is provided in an exhaust passage of an internal combustion engine and configured to purify nitrogen oxide in exhaust gas using ammonia;
   a supply apparatus that is configured to supply a reductant for generating ammonia on an upstream side of the catalyst in the exhaust passage;
   an ammonia sensor that is provided on a downstream side of the catalyst and configured to output a sensor signal based on an ammonia concentration in the exhaust gas;
   an $NO_X$ sensor that is provided on the downstream side of the catalyst and configured to output a sensor signal based on an $NO_X$ concentration in the exhaust gas; and
   an oxygen sensor that is provided on the downstream side of the catalyst and configured to output a sensor signal based on an oxygen concentration in the exhaust gas,
the abnormality determination apparatus comprising a processor that is configured to:
   during a continuation period within which ammonia supply to the catalyst continues after the supply apparatus stops the supply of reductant, calculate the ammonia concentration on the downstream side of the catalyst as a first concentration value, based on the output of the ammonia sensor and the output of the oxygen sensor;
   during the continuation period, calculate the ammonia concentration on the downstream side of the catalyst as a second concentration value, based on the output of the $NO_X$ sensor and the output of the oxygen sensor; and
   determine presence or absence of an abnormality in the ammonia sensor based on the first concentration value and the second concentration value, wherein:
   the processor is further configured to perform calculation of the first concentration value and calculation of the second concentration value when a detection value of the oxygen concentration has reached a state of equilibrium that is substantially identical to an oxygen concentration of atmospheric air in accompaniment with combustion in the internal combustion engine being stopped, and during the continuation period.

2. The abnormality determination apparatus for an ammonia sensor according to claim 1, wherein:
   the processor is further configured to determine the presence or absence of the abnormality in the ammonia sensor based on a plurality of first concentration values calculated and a plurality of second concentration values calculated, when a detection value of the oxygen concentration by the oxygen sensor has reached the state of equilibrium that is substantially identical to the oxygen concentration of atmospheric air in accompaniment with combustion in the internal combustion engine being stopped, and during the continuation period.

3. The abnormality determination apparatus for an ammonia sensor according to claim 1, wherein:
   the processor is further configured to
      compare the first concentration value and the second concentration value to obtain a comparison result, and
      correct an output of the ammonia sensor based on the comparison result.

4. The abnormality determination apparatus for an ammonia sensor according to claim 2, wherein:
   the processor is further configured to
      compare the first concentration value and the second concentration value to obtain a comparison result, and
      correct an output of the ammonia sensor based on the comparison result.

5. The abnormality determination apparatus for an ammonia sensor according to claim 3, wherein:
   the processor is further configured to
      correct the output of the ammonia sensor in response to a difference between the first concentration value and the second concentration value being greater than a first threshold and less than a second threshold that is greater than the first threshold, and
      provide a notification of an occurrence of an abnormality in the ammonia sensor without correcting the output of the ammonia sensor, in response to the difference between the first concentration value and the second concentration value being greater than the second threshold.

6. The abnormality determination apparatus for an ammonia sensor according to claim 4, wherein:
   the processor is further configured to
      correct the output of the ammonia sensor in response to a difference between the first concentration value and the second concentration value being greater than a first threshold and less than a second threshold that is greater than the first threshold, and
      provide a notification of an occurrence of an abnormality in the ammonia sensor without correcting the output of the ammonia sensor, in response to the difference between the first concentration value and the second concentration value being greater than the second threshold.

* * * * *